(12) United States Patent
Kessleman et al.

(10) Patent No.: US 9,008,058 B2
(45) Date of Patent: *Apr. 14, 2015

(54) TECHNIQUES FOR SPATIAL REUSE IN WIRELESS PERSONAL AREA NETWORKS BASED ON VIRTUAL TIME DIVISIONAL MULTIPLE ACCESS

(75) Inventors: Alex Kessleman, San Jose, CA (US); Guoqing Li, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/475,343

(22) Filed: May 18, 2012

(65) Prior Publication Data

US 2012/0230311 A1 Sep. 13, 2012

Related U.S. Application Data

(63) Continuation of application No. 12/157,805, filed on Jun. 12, 2008, now Pat. No. 8,204,028.

(51) Int. Cl.
*H04B 7/212* (2006.01)
*H04W 84/12* (2009.01)
*H04W 72/12* (2009.01)
*H04W 16/28* (2009.01)
*H04W 84/18* (2009.01)

(52) U.S. Cl.
CPC .......... *H04W 72/121* (2013.01); *H04W 16/28* (2013.01); *H04W 84/18* (2013.01)

(58) Field of Classification Search
CPC ... H04W 84/18; H04W 52/42; H04W 72/046; H04W 7/028; H04W 72/121
USPC .................. 370/310, 328, 334–339, 345, 347
See application file for complete search history.

(56) References Cited

U.S. PATENT DOCUMENTS

| | | | |
|---|---|---|---|
| 5,652,751 A * | 7/1997 | Sharony .................. | 370/227 |
| 6,901,064 B2 * | 5/2005 | Cain et al. ............... | 370/337 |
| 7,184,485 B2 * | 2/2007 | Balakrishnan et al. ....... | 375/260 |
| 7,437,166 B2 * | 10/2008 | Osseiran et al. ............ | 455/452.1 |
| 7,893,868 B2 * | 2/2011 | Akita et al. ................ | 342/192 |
| 8,089,947 B2 * | 1/2012 | Cordeiro et al. .......... | 370/348 |
| 8,149,806 B2 * | 4/2012 | Kesselman et al. ......... | 370/338 |
| 8,179,805 B2 * | 5/2012 | Singh et al. ............... | 370/242 |

(Continued)

FOREIGN PATENT DOCUMENTS

| | | |
|---|---|---|
| JP | 2004-260637 | 9/2004 |
| WO | 2006/089568 | 8/2006 |
| WO | 2008/027849 | 3/2008 |

OTHER PUBLICATIONS

Japanese Office Action, Japanese Application No. 2010-547879, mail date Oct. 23, 2012, total of 6 pages.

(Continued)

*Primary Examiner* — Chi H Pham
*Assistant Examiner* — Robert Lopata
(74) *Attorney, Agent, or Firm* — Pillsbury Winthrop Shaw Pittman LLP

(57) ABSTRACT

An embodiment of the present invention provides a method, comprising configuring a transceiver for special reuse using a virtual time division multiple access (TDMA) technique in a wireless personal area network that allows additional non-interfering transceivers to perform concurrent transmissions with said transceiver.

19 Claims, 4 Drawing Sheets

(56) References Cited

U.S. PATENT DOCUMENTS

| | | | |
|---|---|---|---|
| 8,238,313 B2* | 8/2012 | Maltsev et al. | 370/337 |
| 2004/0106436 A1* | 6/2004 | Ochi et al. | 455/562.1 |
| 2004/0170217 A1* | 9/2004 | Ho | 375/134 |
| 2007/0002803 A1 | 1/2007 | Destino et al. | |
| 2008/0069275 A1* | 3/2008 | Horiguchi et al. | 375/347 |
| 2008/0175198 A1* | 7/2008 | Singh et al. | 370/329 |
| 2008/0175199 A1* | 7/2008 | Shao et al. | 370/329 |
| 2010/0014489 A1* | 1/2010 | Qin et al. | 370/336 |
| 2011/0032881 A1* | 2/2011 | Lee | 370/328 |
| 2011/0038356 A1* | 2/2011 | Bachrach | 370/337 |
| 2011/0038405 A1* | 2/2011 | Axnas et al. | 375/227 |
| 2012/0218976 A1* | 8/2012 | Kesselman et al. | 370/336 |

OTHER PUBLICATIONS

Chinese Office Action with English Translation corresponding to Chinese Application No. 200910147581.0, dated Jun. 14, 2012, 15 pages.

Japanese Office Action, Japanese Application No. 2010-547879, mail date Sep. 10, 2013, total of 8 pages.

* cited by examiner

TECHNIQUES FOR SPATIAL REUSE IN WIRELESS PERSONAL AREA NETWORKS BASED ON VIRTUAL TIME DIVISIONAL MULTIPLE ACCESS

CROSS-REFERENCE TO RELATED APPLICATIONS

This application is a continuation of U.S. patent application Ser. No. 12/157,805 filed Jun. 12, 2008 now U.S. Pat. No. 8,204,028, the contents of which are hereby incorporated by reference in their entirety.

BACKGROUND

The availability of 76 Hz of unlicensed spectrum in the 60 GHz band offers the potential for multi-Gigabit indoor wireless personal area networking (WPAN). Applications that require large bandwidth include uncompressed High Definition (HD) video streaming, fast file download from an airport kiosk (Sync & Go) and wireless display and docking, to name just a few. These applications cannot be supported over existing home networking solutions (IEEE 802.11a/b/g/n and WiMedia UWB) because the required data rates far exceed the capabilities of these networks.

A mmwave communication link is less robust than those at lower frequencies (e.g. 2.4 GHz and 5 GHz bands) because of its inherent isolation due to both oxygen absorption, which attenuates the signal over long range, and its short wavelength, which provides high attenuation through obstructions such as walls and ceilings. Thus, one of the biggest challenges for designing a high data rate radio system for the 60 GHz band is the limited link budget resulting from high path loss during radio propagation. On the one hand, it is preferable to employ directional antennas for high-speed point-to-point data transmission. On the other hand, a directional antenna pattern covering a wide range of angles to give omni-directional coverage is usually employed to aid in neighbor discovery and beam-steering decisions. A lower band channel (e.g. IEEE 802.11 WLAN in 2.4 GHz or 5 GHz bands or WiMedia UWB in 6 GHz band) may be used as an out-of-band (OOB) control channel providing robust transmission and coverage.

Spatial reuse is the ability of the network to support concurrent transmissions that depends on the network topology and individual transmission ranges. Devices performing directional transmissions can be separated in space such that certain pairs of devices can communicate simultaneously. However, in a traditional 60 GHz wireless personal area network (WPAN), the channel time is scheduled using Time Division Multiple Access (TDMA) technology that does not support parallel transmissions. Channel time reservations are usually performed for each super-frame (the basic timing division for TDMA) and communicated in the beacon frame(s) sent on the control channel as seen in FIG. 1 at 100.

Thus, a strong need exists for techniques for spatial reuse in wireless personal area networks.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
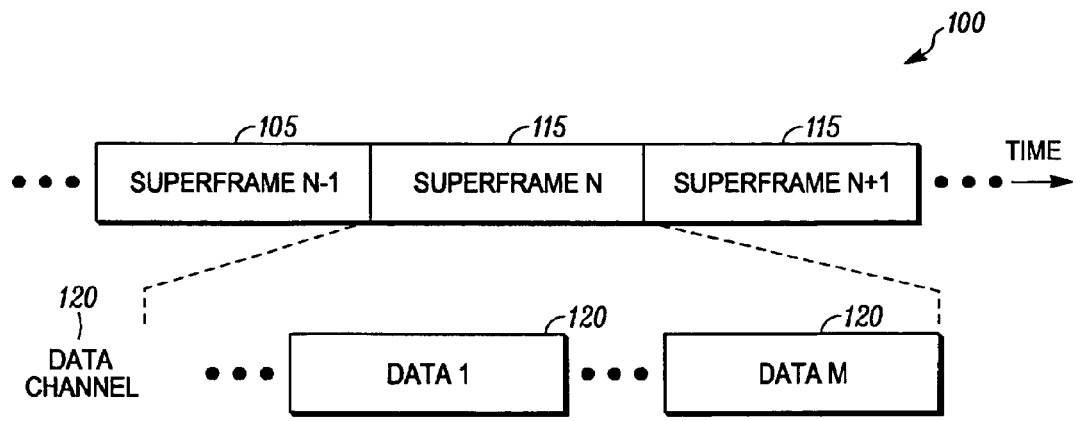
FIG. 1 illustrates an example of a traditional TDMA mechanism.

It will be appreciated that for simplicity and clarity of illustration, elements illustrated in the figures have not necessarily been drawn to scale. For example, the dimensions of some of the elements are exaggerated relative to other elements for clarity. Further, where considered appropriate, reference numerals have been repeated among the figures to indicate corresponding or analogous elements.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

Embodiments of the invention may be used in a variety of applications. Some embodiments of the invention may be used in conjunction with various devices and systems, for example, a transmitter, a receiver, a transceiver, a transmitter-receiver, a wireless communication station, a wireless communication device, a wireless Access Point (AP), a modem, a wireless modem, a Personal Computer (PC), a desktop computer, a mobile computer, a laptop computer, a notebook computer, a tablet computer, a server computer, a handheld computer, a handheld device, a Personal Digital Assistant (PDA) device or a handheld PDA device.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. For example, "a plurality of stations" may include two or more stations.

Figure 2:
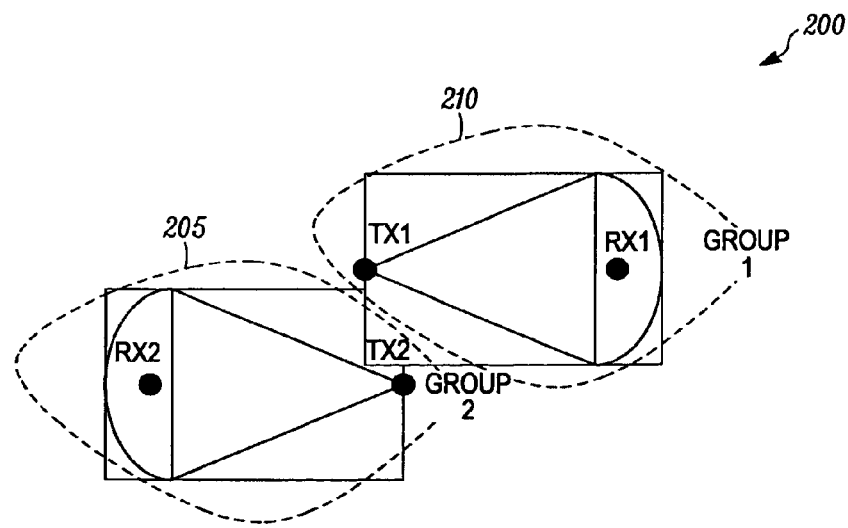
FIG. 2 shows spatial reuse groups division in an embodiment of the present invention.

An embodiment of the present invention provides a virtual time division multiple access (TDMA) scheme that allows non-interfering devices to perform concurrent transmissions. All links (transmitter/receiver [also referred to herein as a transceiver] pairs of devices) may be divided into a number of groups so that a directional transmission of a transmitter in one group does not interfere with a receiver in a different group as shown generally as 200 of FIG. 2. Group 1 is shown at 210 with transmitter (also referred to herein as transceiver) 1 and receiver (also referred to herein as transceiver) 1 and group 2 at 205 with transmitter (transceiver) 2 and receiver (transceiver) 2. The links may be either unidirectional or bidirectional. We denote the number of such groups by k.

Figure 3:
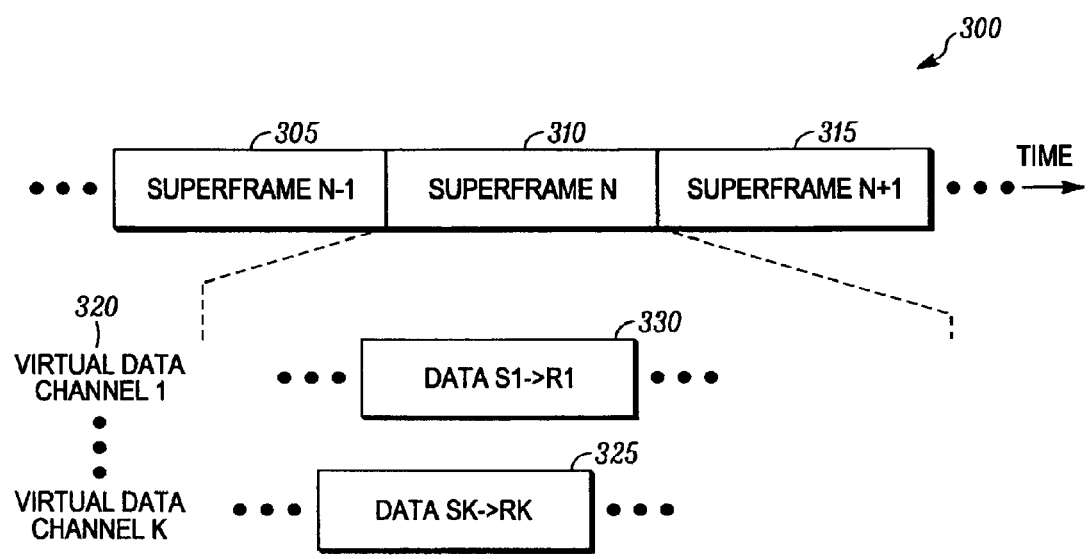
FIG. 3 depicts a proposed virtual TDMA mechanism in an embodiment of the present invention.

In this way, data transmissions may be scheduled independently using TDMA on k virtual channels 320 as seen generally at 300 of FIG. 3. Superframe n−1 is shown at 305, superframe n at 310 and superframe n+1 at 315. Data S1 to R1 is shown at 330 and data Sk to Rk is shown at 325. Under a centralized MAC (e.g. IEEE 802.15.3c), this subdivision can be performed by the coordinator while under a distributed MAC (e.g. WiMedia UWB) such groups may be defined through negotiation between devices on the control channel. In order to maximize the number of parallel transmissions (that is the number of groups k), transmitting devices may decrease the transmission power and/or change the beam-steering patterns. The scheduling of channel time reservations in different groups needs to be coordinated if a particular device participates in multiple links falling into different groups so that this device is not scheduled in more than one group at a time.

To divide the links into groups, it is necessary to identify the interference level caused by a transmitter (transceiver) at potential victim receivers (transceivers). The Coordinator under a centralized MAC or each device under a distributed MAC constructs a table indicating whether the transmission of a particular device interferes with an existing link. The compatibility table determines which links are able to transmit simultaneously and shall be updated when the beam-steering pattern changes or a devices moves to a new location. This table is used to construct the spatial reuse groups, which allow simultaneous transmissions in the WPAN thus achieving spatial reuse.

Figure 4:
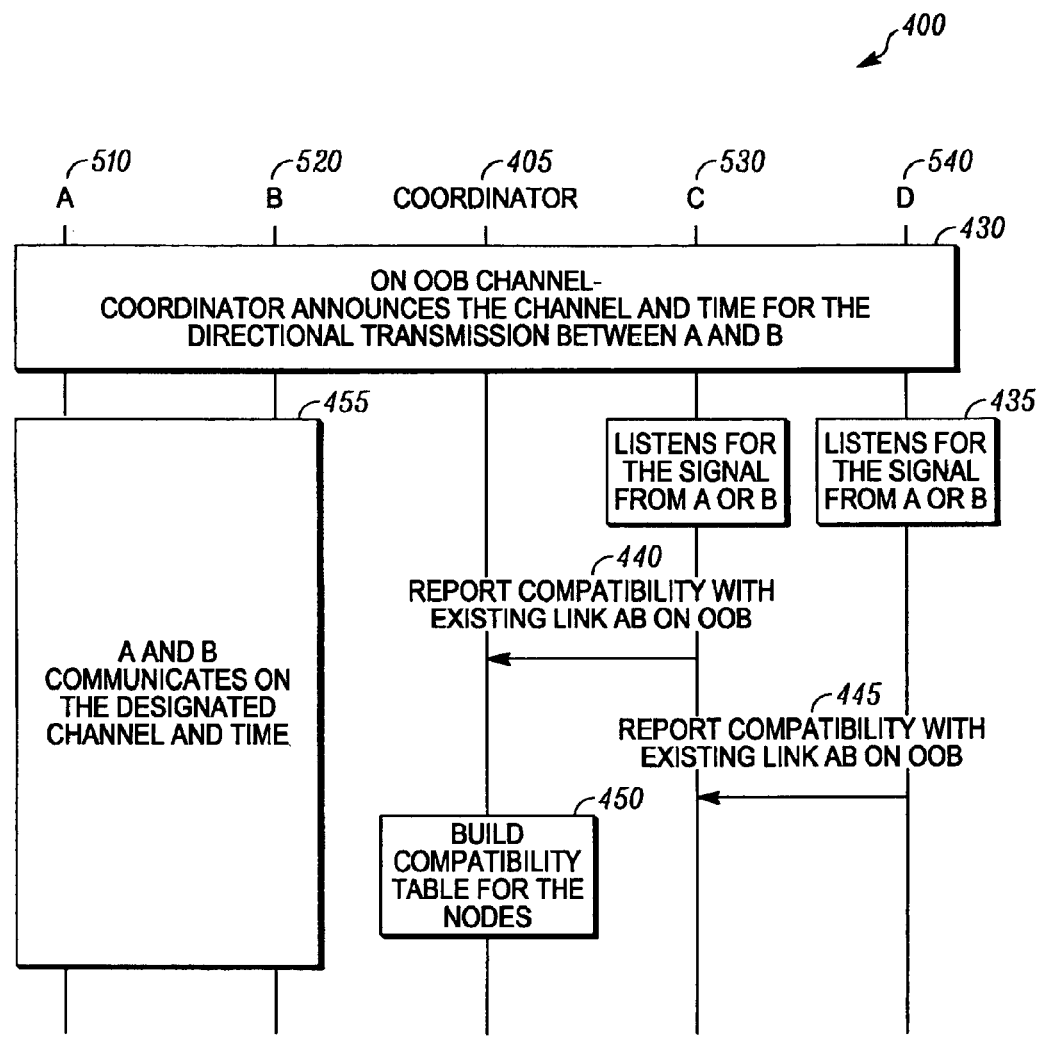
FIG. 4 depicts the message flow to evaluate the link compatibility in an embodiment of the present invention.
Figure 5:
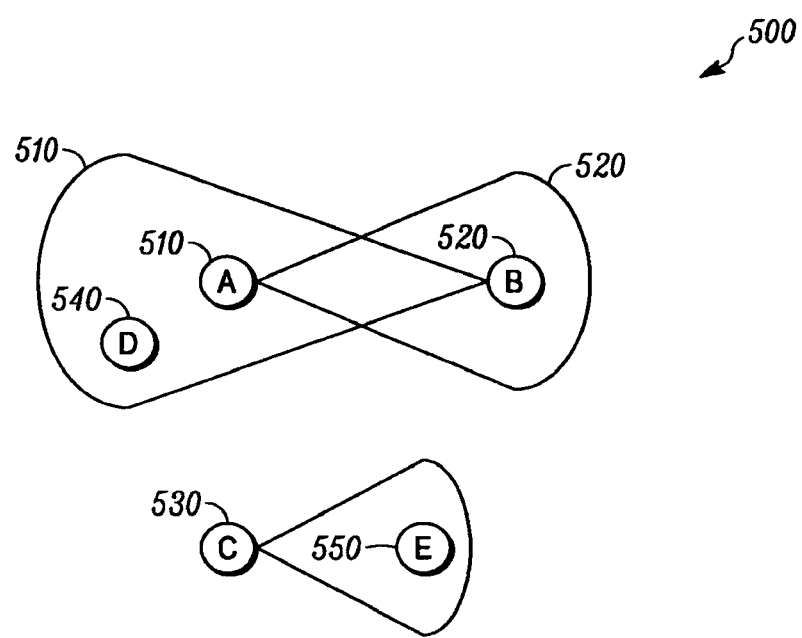
FIG. 5 illustrates a wireless personal area network (WPAN) topology in an embodiment of the present invention.

Turning now to FIG. 4 at 400 is illustrated the message flow of the interference table calculation process, which is done with the aid of an out of band (OOB) control channel. FIG. 5 at 500 is used as an example of the WPAN topology with A, B, C, D, E shown as 510, 520, 530, 540 and 550 respectively. It is understood that the topology of FIG. 5 is but one example topology and the present invention is not limited to this topology. The first step is that the Coordinator 405 announces on the OOB control channel the time and the data channel used for the directional transmission of an existing link (e.g., bidirectional link A 510<->B 520) 430. For a distributed MAC, the transmitting devices will announce their directional transmissions individually. Then the rest of the devices (e.g., C 530, D 540 and E 550) will listen 435 for an amount of time sufficient to determine whether they can hear signal from either A 510 or B 520. If a device (e.g., C 530 and E 550) cannot hear the signal, that means it is not affected by the link under consideration (e.g. C 530 and E 550 are outside the beam-width of A 510 and B 520 and C 530→E 550 transmission will not interfere with that of A 410<->B 520). If a device can hear the signal, that means it is within the coverage area of the link under consideration (e.g. D 540 is inside the beam-width of B 520, thus D 540 will receive B's 520 transmission when the link A 510<->B 520 is active. As a consequence, if D 540 transmits, it will interferer B's 520 reception from A 510). Finally, the rest of the devices report their compatibility 440 and 445 with the link under consideration to the Coordinator 405 through the OOB channel. This information is used to build 450 a compatibility table set forth below. At 455, A 510 and B 520 communicate on the designated channel and time. For a distributed MAC, no reporting is needed and each node evaluates its own compatibility with the link under consideration.

TABLE 1

Links compatibility

| | Compatible Devices (can receive when the link is active) | Incompatible Devices (cannot receive when the link is active) |
|---|---|---|
| Old Link 1 (A<->B) | C and E | D |
| New Link 2 (C->E) | A, B and D | None |

For example, the communication between C 530 and E 550 may be granted concurrently with A 510<->B 520 if requested since they do not interfere with each other. Henceforth, the links A 510<->B 520 and C 530→E 550 belong to two different spatial reuse groups.

While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

We claim:

1. A device comprising:
   a transceiver configured to establish a directional communication link with a receiving device in a wireless network, in which the transceiver and the receiving device belong to a first group of the wireless network, the directional communication link being such that it does not interfere with a concurrent directional communication link between devices of a second group of the wireless network, wherein to associate with the first group, the transceiver is configured to:
   receive a notification from a coordinator indicating one or more details of the concurrent directional communication link of the second group;
   based on the one or more details, determine whether the transceiver receives at least part of data of the concurrent directional communication link,
   wherein, based on a determination result that the transceiver did not receive at least part of data of the concurrent directional communication link of the second group, the transceiver is adapted to associate itself with the first group; and
   transmit the determination result to the coordinator, and based on the determination result, the coordinator is configured to manage compatibility information indicating possible simultaneous directional communication links in the wireless network.

2. The device of claim 1, wherein the one or more details of the concurrent directional communication link include time, data channel, or both, associated with the concurrent directional communication.

3. The device of claim 1, wherein the transceiver is configured to receive the notification, transmit the determination result, or both, on a control channel which is independent of a data channel supporting the directional communication link between the transceiver and the receiving device or the concurrent directional communication link.

4. The device of claim 1, wherein in order to maximize a number of simultaneous directional communication links in the wireless network, transceiver is further configured to decrease a transmission power, change a beam-steering pattern, or both, associated with the directional communication link.

5. The device of claim 1, wherein the transceiver is configured to establish the directional communication link with only one receiving device at a time.

6. The device of claim 1, wherein the determination result is dependent on a beam-steering pattern, or a location, or both, of the transceiver.

7. A method comprising:
configuring a transceiver to establish a directional communication link with a receiving device in a wireless network, in which the transceiver and the receiving device belong to a first group of the wireless network, the directional communication link being such that it does not interfere with a concurrent directional communication link between devices of a second group of the wireless network; and
associating the transceiver to the first group of the wireless network, said associating comprising:
receiving a notification from a coordinator indicating one or more details of the concurrent directional communication link of the second group;
based on the one or more details, determining whether the transceiver receives at least part of data of the concurrent directional communication link, wherein, based on a determination result that the transceiver did not receive at least part of data of the concurrent directional communication link of the second group, the transceiver is adapted to associate itself with the first group; and
transmitting the determination result to the coordinator, wherein, based on the determination result, the coordinator is configured to manage compatibility information indicating possible simultaneous directional communication links in the wireless network.

8. The method of claim 7, wherein the one or more details of the concurrent directional communication link include time, data channel, or both, associated with the concurrent directional communication.

9. The method of claim 7, wherein said receiving a notification utilizes a control channel which is independent of a data channel supporting the directional communication link between the transceiver and the receiving device or the concurrent directional communication link.

10. The method of claim 7, further comprising decreasing a transmission power, changing a beam-steering pattern, or both, associated with the directional communication link in order to maximize a number of simultaneous directional communication links in the wireless network.

11. The method of claim 7, wherein said configuring the transceiver to establish the directional communication link comprises configuring the transceiver to establish the directional communication link with only one receiving device at a time.

12. The method of claim 7, wherein the determination result is dependent on a beam-steering pattern, or a location, or both, of the transceiver.

13. A coordinating device comprising:
a memory; and
a processor configured to identify one or more devices that belong to a first device group, wherein a first directional communication link between devices of the first device group does not interfere with a concurrent second directional communication link between devices of a second device group, wherein to identify the one or more devices belonging to the first group, the processor is further configured to:
transmit a notification to a plurality of devices in the wireless network indicating one or more details of the concurrent second directional communication link;
receive, from each of one or more devices of the plurality of devices, a determination result indicating whether that device received at least part of data of the concurrent second directional communication link;
if the respective determination results indicate that the one or more devices did not receive at least part of the data of the concurrent second directional communication link, identify the one or more devices as belonging to the first device group; and
update information regarding identification of the one or more devices of the first device group in the memory.

14. The device of claim 13, wherein the one or more details of the concurrent second directional communication link include time, data channel, or both, associated with the concurrent second directional communication link.

15. The device of claim 13, wherein the processor is configured to transmit the notification, receive the determination result, or both, on a control channel which is independent of a data channel supporting the first directional communication link or the concurrent second directional communication link.

16. The device of claim 13, wherein the determination result is dependent on a beam-steering pattern, or a location, or both, of the device.

17. A method comprising:
identifying one or more devices that belong to a first device group, wherein a first directional communication link between devices of the first device group does not interfere with a concurrent second directional communication link between devices of a second device group, said identifying comprising:
transmitting a notification to a plurality of devices in the wireless network indicating one or more details of the concurrent second directional communication link;
receiving, from each of one or more devices of the plurality of devices, a determination result indicating whether that device received at least part of data of the concurrent second directional communication link;
if the respective determination results indicate that the one or more devices did not receive at least part of the data of the concurrent second directional communication link, identifying the one or more devices as belonging to the first device group; and
updating information regarding identification of the one or more devices of the first device group in the memory.

18. The method of claim 17, wherein the one or more details of the concurrent second directional communication link include time, data channel, or both, associated with the concurrent second directional communication link.

19. The method of claim 17, wherein said transmitting a notification, said receiving a determination result, or both utilize a control channel which is independent of a data channel supporting the first directional communication link or the concurrent second directional communication links.

* * * * *